United States Patent
Won et al.

(10) Patent No.: US 12,026,198 B2
(45) Date of Patent: Jul. 2, 2024

(54) IDENTIFYING MUSIC ATTRIBUTES BASED ON AUDIO DATA

(71) Applicant: LEMON INC., Grand Cayman (KY)

(72) Inventors: Minz Won, Los Angeles, CA (US);
Keunwoo Choi, Los Angeles, CA (US);
Yuanjian Feng, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 210 days.

(21) Appl. No.: 17/384,576

(22) Filed: Jul. 23, 2021

(65) Prior Publication Data

US 2023/0022947 A1    Jan. 26, 2023

(51) Int. Cl.
| | | |
|---|---|---|
| G06F 17/00 | (2019.01) | |
| G06F 16/65 | (2019.01) | |
| G06F 16/683 | (2019.01) | |
| G06N 3/08 | (2023.01) | |
| G10G 1/00 | (2006.01) | |
| G10H 1/00 | (2006.01) | |

(52) U.S. Cl.
CPC ............ *G06F 16/683* (2019.01); *G06F 16/65* (2019.01); *G06N 3/08* (2013.01); *G10G 1/00* (2013.01); *G10H 1/0025* (2013.01)

(58) Field of Classification Search
CPC ......... G06F 16/683; G06F 16/65; G06N 3/08; G10G 1/00; G10H 1/0025
USPC .......................................................... 700/94
See application file for complete search history.

(56) References Cited

U.S. PATENT DOCUMENTS

| | | | | |
|---|---|---|---|---|
| 11,860,969 | B2* | 1/2024 | Dehghani | G06F 17/14 |
| 2020/0334520 | A1* | 10/2020 | Chen | G06F 40/216 |
| 2020/0372066 | A1* | 11/2020 | Saggi | G06N 20/00 |
| 2023/0197043 | A1* | 6/2023 | Martinez Ramirez | G06N 3/084 |
| | | | | 381/61 |

FOREIGN PATENT DOCUMENTS

CN    111598216 A    8/2020

OTHER PUBLICATIONS

Kim: Polyphonic Sound Event Detection Based on Residual Convolutional Recurrent Neural Network with Semi-supervised Loss Function (Year: 2021).*
Ishizuka, Structure-Aware Drum Transcription Based on Self-Attention Mechanisms (Year: 2021).*
(Continued)

*Primary Examiner* — Paul C McCord
(74) *Attorney, Agent, or Firm* — BakerHostetler

(57) ABSTRACT

The present disclosure describes techniques for identifying music attributes. The described techniques comprises receiving audio data of a piece of music; determining at least one attribute of the piece of music based on the audio data of the piece of music using a model; the model comprising a convolutional neural network and a transformer; the model being pre-trained using training data, wherein the training data comprise labelled data associated with a first plurality of music samples and unlabelled data associated with a second plurality of music samples, the labelled data comprise audio data of the first plurality of music samples and label information indicative of attributes of the first plurality of music samples, and the unlabelled data comprise audio data of the second plurality of music samples.

18 Claims, 15 Drawing Sheets

(56) References Cited

OTHER PUBLICATIONS

Miyazaki, Convolution-Augmented Transformer for Semi-Supervised Sound Event Detection (Year: 2020).*
Chen: Harmony Transformer: Incorporating Chord Segmentation Into Harmony Recognition (Year: 2019).*
ARXIV_PDF_avail_5_12_21; downloaded from Archive.org and available at least May 21, 2021.*
ARXIV_submission_page_avail_5_21; DEEP_AI_post_avail_5_14_21 (Year: 2021).*
DEEP_AI_post_avail_5_14_21; DEEP_AI_post_avail_5_14_21 (Year: 2021).*
Krizhevsky et al.; "ImageNet Classification with Deep Convolutional Neural Networks"; Advances in Neural Information Processing Systems; vol. 25; 2012; p. 1097-1105.
Choi et al.; "Automatic tagging using deep convolutional neural networks"; Int'l Society of Music Information Retrieval; 2016; 7 pages.
Pons et al.; "End-to-end learning for music audio tagging at scale"; Int'l Society for Music Information Retrieval Conf.; 2018; 8 pages.
Lee et al.; "Sample-level Deep Convolutional Neural Networks for Music Auto-tagging Using Raw Waveforms"; Sound and Music Computing Conf.; 2017; 7 pages.
Won et al.; "Data-Driven Harmonic Filters for Audio Representation Learning"; Int'l Conf. on Acoustics, Speech and Signal Processing; 2020; 5 pages.
Won et al.; "Evaluation of CNN-based Automatic Music Tagging Models"; Int'l Proc. Of Sound and Music Computing; 2020; 7 pages.
Brendel et al.; "Approximating CNNs with Bag-of-local-Features models works surprisingly well on ImageNet"; Int'l Conf. on Learning Representations; 2019; 15 pages.
Bertin-Mahieux et al.; "The Million Song Dataset"; Columbia Academic Commons; 2011; 6 pages.
Oord et al.; "Representation learning with constrastive predictive coding"; arXiv prepint; 2018; 13 pages.
He et al.; "Momentum Contrast for Unsupervised Visual Representation Learning"; Proceedings of the IEEE Conf. on Computer Vision and Pattern Recognition; 2020; p. 9729-9738.
Chen et al.; "A Simple Framework for Contrastive Learning of Visual Representations"; Int'l Conf. of Machine Learning; vol. 119; 2020; p. 1597-1607.
Grill et al.; "Bootstrap your own latent: A new approach to self-supervised learning"; arXiv preprint; 2020; 35 pages.
Chapelle et al.; "Semi-Supervised Learning"; IEEE Transactions on Neural Networks; vol. 20 No. 3; Mar. 2009; p. 544.
Xie et al.; "Self-Training With Noisy Student Improves ImageNet Classification"; Proceedings of the IEEE/CVF Conf. on Computer Vision and Pattern Recognition; 2020; p. 10687-10698.
Chen et al.; "Big Self-Supervised Models are Strong Semi-Supervised Learners"; Conf. on Neural Information Processing Systems; 2020; 18 pages.
Dietterich et al.; "Solving the multiple instance problem with axis-parallel rectangles"; Artificial Intelligence; vol. 89; Jan. 1997; p. 31-71.
McFee et al.; "Adaptive Pooling Operators for Weakly Labeled Sound Event Detection"; IEEE/ACM Transactions on Audio, Speech, and Language Processing; vol. 26; Nov. 2018; p. 2180-2193.
Choi et al.; "Convolutional recurrent neural networks for music classification"; IEEE Int'l Conf. on Acoustics, Speech, and Signal Processing; Mar. 2017; 5 pages.
Won et al.; "Toward Interpretable Music Tagging with Self-Attention"; arXiv 1906.04972; 2019; 13 pages.
Devlin et al.; "BERT: Pre-training of Deep Bidirectional Transformers for Language Understanding": Proceedings of the Conf. of the North American Chapter of the Assoc. for Computional Linguistics: Human Language Technologies; vol. 1; Jun. 2019; p. 4171-4186.
Vaswani et al.; "Attention is all you need"; $31^{st}$ Conf. on Neural Information Processing Systems; 2017; 15 pages.
Huang et al.; "Music Transformer: Generating Music with Long-Term Structure"; Int'l Conf, of Learning Representations; 2019; 14 pages.
Arnab et al.; "ViViT: A Video Vision Transformer"; arXiv 2103.15691; 2021; 14 pages.
Dosovitskiy et al.; "An Image is Worth 16×16 Words: Transformers for Image Recognition at Scale"; Int'l Conf. on Learning Representations; 2021; 22 pages.
Li et al.; "Large-Scale Domain Adaptation via Teacher-Student Learning"; arXiv 1708.05466; 2017; 5 pages.
Lee; "Pseudo-Label: The Simple and Efficient Semi-Supervised Learning Method for Deep Neural Networks"; Workshop on Challenges in Representation Learning; vol. 3 No. 2; 2013; 6 pages.
Kim et al.; "Sequence-Level Knowledge Distillation"; Conf. on Empirical Methods in Natural Language Processing; 2016; 11 pages.
He et al.; "Deep Residual Learning for Image Recognition"; IEEE Conf. on Computer Vision and Pattern Recognition; 2016; p. 770-778.
Ioffe et al.; "Batch Normalization: Accelerating Deep Network Training by Reducing Internal Covariate Shift"; $32^{nd}$ Int'l Conf. on Machine Learning; 2015; p. 448-456.
Kingma et al. "Adam: A Method for Stochastic Optimization"; $3^{rd}$ Int'l Conf. on Learning Representations; 2015; 15 pages.
Hinton et al.; "Distilling the Knowledge in a Neural Network"; arXiv 1503.02531; 2015; 9 pages.
Janne Spijkervet et al.; "Spijkervet/torchaudio-augmentations: v1.0"; https://zenodo.org/record/4748582#.YbOcwZ6lbcs; Zenodo; May 11, 2021; accessed Dec. 10, 2021; 4 pages.
Choi et al.; "The Effects of Noisy Labels on Deep Convolutional Neural Networks for Music Tagging"; IEEE Transactions on Emerging Topics in Computational Intelligence; vol. 2 No. 2; Apr. 2018; p. 139-149.
Won et al.; "Multimodal Metric Learning for Tag-Based Music Retrieval"; IEEE Int'l Conf. on Acoustics, Speech and Signal Processing; 2021; 5 pages.
Davis et al.; "The relationship between Precision-Recall and ROC curves"; Proceedings of the $23^{rd}$ Int'l Conf. on Machine Learning; Jun. 2006; p. 233-240.
Kim et al; "Sample-Level CNN Architectures for Music Auto-Tagging Using Raw Waveforms"; IEEE Int'l Conf. on Acoustics, Speech and Signal Processing; 2018; p. 366-370.
International Patent Application No. PCT/SG2022/050404; Int'l Written Opinion and Search Report; dated Jan. 16, 2023; 11 pages.
Kong et al.; "Sound Event Detection of Weakly Labelled Data with CNN-Transformer and Automatic Threshold Optimization"; IEEE/ACM Transactions on Audio, Speech, and Language Processing; vol. 28; 2020 p. 2450-2460.
Won et al.; "Semi-Supervised Music Tagging Transformer"; Proceedings of the $22^{nd}$ ISMIR Conf.; Nov. 2021; p. 769-776.
Kum et al.; "Semi-Supervised Learning Using Teacher-Student Models for Vocal Melody Extraction"; Audio and Speech Processing; arXiv:2008.06358; Aug. 2020; 8 pages.
Qiu et al.; "DBTMPE: Deep Bidirectional Transformers-Based Masked Predictive Encoder Approach for Music Genre Classification"; Mathematics; vol. 9; 2021; 17 pages.

* cited by examiner

| layer | output shape |
|---|---|
| Input | $B \times 1 \times F \times T$ |
| Conv ($3 \times 3$) | $B \times C \times F \times T$ |
| MaxPool ($2 \times 2$) | $B \times C \times F/2 \times T/2$ |
| Conv ($3 \times 3$) | $B \times C \times F/2 \times T/2$ |
| MaxPool ($2 \times 2$) | $B \times C \times F/4 \times T/4$ |
| Conv ($3 \times 3$) | $B \times C \times F/4 \times T/4$ |
| MaxPool ($2 \times 1$) | $B \times C \times F/8 \times T/4$ |
| Reshape | $B \times (C \cdot F/8) \times T/4$ |
| Fully-connected | $B \times C' \times T/4$ |

FIG. 3

Noisy Student Training

Input labeled data $X$, labels $Y$, unlabeled data $Z$
Models teacher model $\mathcal{T}$, student model $\mathcal{S}$
Functions loss function $\mathcal{L}$, data augmentation $\mathcal{A}$, back propagation $\mathcal{B}$

Train
1  for $x \in X, y \in Y$
2      do
3          $p \leftarrow \mathcal{T}(x)$              // predict
4          $l \leftarrow \mathcal{L}(p, y)$            // get loss
5          $\mathcal{T} \leftarrow \mathcal{B}(\mathcal{T}, l)$    // update teacher model
6      end do
7  end for
8  for $x \in X, y \in Y, z \in Z$
9      do
10         $p_1 \leftarrow \mathcal{S}(x)$             // predict
11         $l_1 \leftarrow \mathcal{L}(p_1, y)$         // get supervised loss
12         $\psi \leftarrow \mathcal{T}(z)$             // generate pseudo-label
13         $\hat{z} \leftarrow \mathcal{A}(z)$          // data augmentation
14         $p_2 \leftarrow \mathcal{S}(\hat{z})$        // predict
15         $l_2 \leftarrow \mathcal{L}(p_2, \psi)$      // get semi-supervised loss
16         $\mathcal{S} \leftarrow \mathcal{B}(\mathcal{S}, l_1 + l_2)$   // update student model
17     end do
18 end for

FIG. 5

| Models | ROC-AUC | PR-AUC |
|---|---|---|
| FCN [2] | 0.8742 | 0.2963 |
| Musicnn [3] | 0.8788 | 0.3036 |
| Sample-level [4] | 0.8789 | 0.2959 |
| Sample-level+SE [36] | 0.8838 | 0.3109 |
| CRNN [18] | 0.8460 | 0.2330 |
| CNNSA [19] | 0.8810 | 0.3103 |
| Harmonic CNN [5] | 0.8898 | 0.3298 |
| Short-chunk CNN [6] | 0.8883 | 0.3251 |
| Short-chunk ResNet [6] | 0.8898 | 0.3280 |
| Transformer (proposed)§ | 0.8916 | 0.3358 |
| Transformer (proposed) + DA† | 0.8972 | 0.3479 |

| Models | #param | ROC-AUC | PR-AUC |
|---|---|---|---|
| ResNet [6] | 13.5m | 0.9098 | 0.3525 |
| ResNet+DA | 13.5m | 0.9141 | 0.3705 |
| ResNet+DA+KE | 13.5m | 0.9165 | 0.3728 |
| ResNet+DA+KD | 3.4m | 0.9171 | 0.3742 |
| Transformer§ | 4.6m | 0.9188 | 0.3775 |
| Transformer+DA† | 4.6m | 0.9191 | 0.3845 |
| Transformer+DA+KE | 4.6m | 0.9204 | 0.3839 |
| Transformer+DA+KD | 0.5m | 0.9217 | 0.3889 |

| width | depth | ROC-AUC | PR-AUC |
|---|---|---|---|
| 32 | 4 | 0.9118 | 0.3528 |
| 64 | 4 | 0.9178 | 0.3754 |
| 128 | 4 | 0.9194 | 0.3776 |
| 256 | 4 | 0.9191 | 0.3845 |
| 512 | 4 | 0.9177 | 0.3788 |
| 768 | 4 | 0.9162 | 0.3707 |
| 1024 | 4 | 0.9174 | 0.3736 |
| 256 | 1 | 0.9180 | 0.3736 |
| 256 | 2 | 0.9193 | 0.3805 |
| 256 | 4 | 0.9199 | 0.3814 |
| 256 | 8 | 0.9181 | 0.3826 |
| 256 | 12 | 0.9165 | 0.3780 |
| 256 | 16 | 0.9169 | 0.3785 |

FIG. 13

IDENTIFYING MUSIC ATTRIBUTES BASED ON AUDIO DATA

BACKGROUND

Music classification plays an important role in understanding music semantics and music recommendation. There is a strong demand of music classification from industries that have music recommendation service based on larger-scale music libraries. However, conventional music classification techniques may not fulfil needs of the industries due to various limitations. Therefore, improvements in music classification techniques are needed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 3 illustrates an example front end of Music Tagging Transformer that may be used in accordance with the present disclosure.

FIG. 5 illustrates an example pseudocode of noisy student training that may be used in accordance with the present disclosure.

FIGS. 10-11 illustrate example tables depicting the varying performance ability of different music tagging models.

FIG. 13 illustrates an example table depicting the performance ability of a Music Tagging Transformer model that may be used in accordance with the present disclosure.

DETAILED DESCRIPTION OF ILLUSTRATIVE EMBODIMENTS

Figure 1:
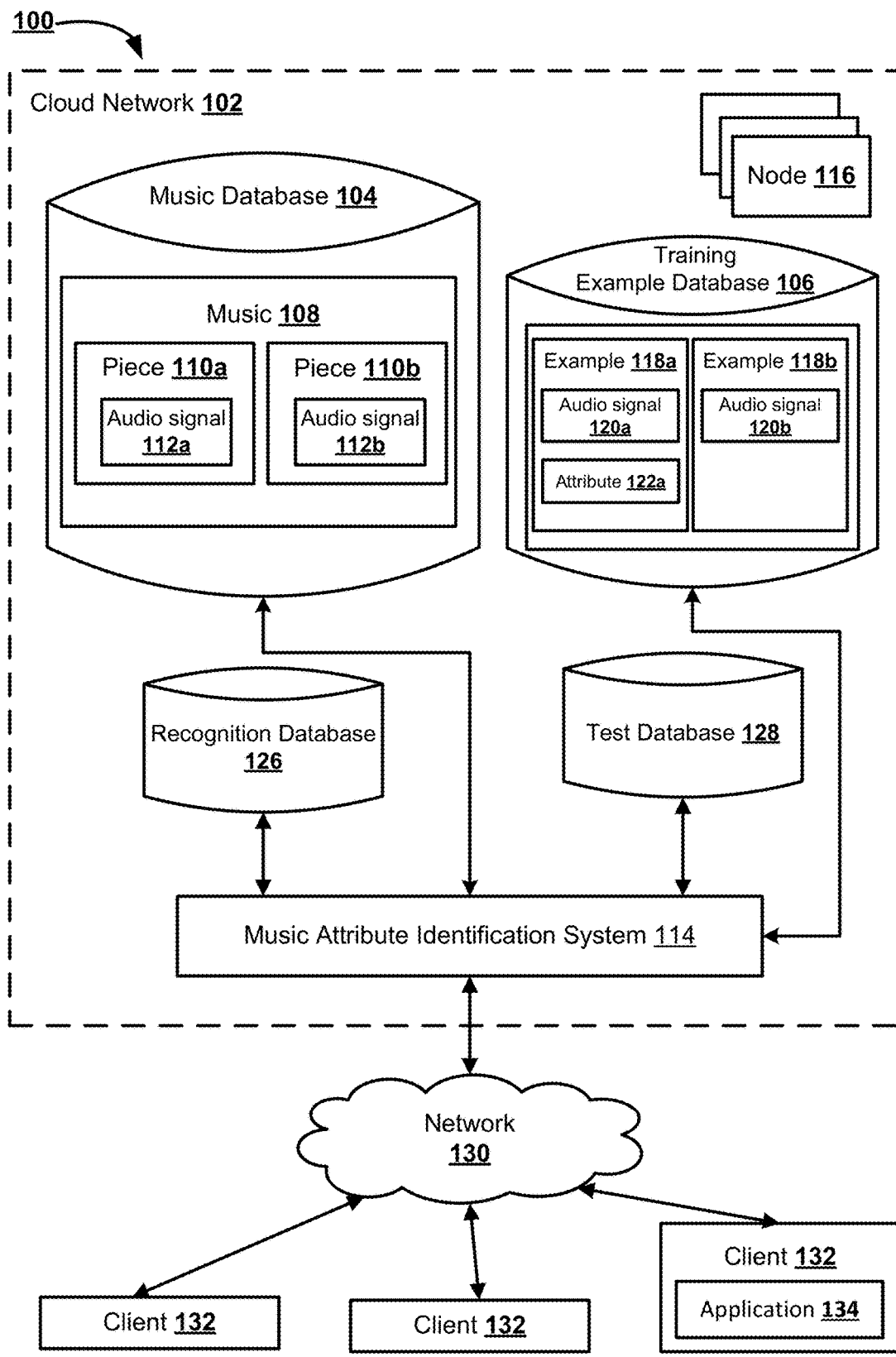
FIG. 1 is a schematic diagram illustrating an example system for use in accordance with the present disclosure.

Identifying music attributes so as to classify music is essential for music discovery and music recommendation systems. Automatic music tagging is a classification task that aims to predict relevant attributes (i.e., tags) for a given piece of music. Based on audio characteristics of a piece of music, a trained music tagging model may predict appropriate tags about the piece of music, for example, genre, mood, instrument, region, decade, etc.

Recently, automatic music tagging performance has been improved mostly by convolutional neural network (CNN) with various deep architectures. However, there are still some limitations in current music tagging research. For example, there is a limited amount of labelled data for supervised learning. Labelling music tags is time-consuming, and it requires domain expertise to label the high-level semantics. A large-scale dataset, the million song dataset (MSD), which literally includes a million songs, has become popular in music tagging research. Among the million songs, only about 24% of the songs are labelled with at least one of the top 50 music tags, and about 76% of the songs in the MSD has been discarded in the current music tagging research. This type of setup, i.e., small labelled data with large unlabelled data, is not only limited to the MSD but also can be found in most of real-world data regardless of the domain. For another example, music signals are in a form of a sequential data, but the current music tagging models make prediction on short audio chunks (3-5 seconds long), densely striding max-pooling layers, and a global pooling layer. For instance, to predict music tags of a 3-minute song, the current models split the audio into multiple short audio chunks and the models make prediction on each chunk. Then, the predictions are simply aggregated through majority vote or global average-pooling/max-pooling. That means the models are performing like bag-of-features models instead of modeling music representation as a sequence.

To address the issues, the present disclosure introduces a Music Tagging Transformer (MTT) model that is trained with a semi-supervised approach. The Music Tagging Transformer model comprises two parts: convolutional neural network (CNN) front end and Transformer back end. The CNN front end captures local audio characteristics in shallow convolutional layers. Then, the Transformer back end temporally summarizes the sequence of the extracted features using stacked self-attention layers. It has been proved that the MTT model outperforms current music tagging models that are based on CNN under a supervised scheme.

The MTT model may be further improved by using noisy student training, a semi-supervised approach that utilizes both labelled and unlabelled data combined with data augmentation. It is very meaningful that abundant unlabelled data may be used for music tagging techniques.

Additionally, the present disclosure initiates a new split of MSD, i.e., cleaned and artist-level split (C&A split). The C&A split can alleviate noisy evaluation (i.e., incorrect evaluation). It can also take the artist information into consideration without causing overly optimistic evaluation. By using the C&A split, the Music Tagging Transformer model may utilize the entire audio data of the MSD.

FIG. 1 illustrates an example environment 100 in which the systems and methods described herein may be implemented. Environment 100 includes a cloud network 102 and at least one client device 132. Cloud network 102 and client device 132 are in communication via one or more networks 130. The MTT model may be comprised in either the client device 132 or a music attribute identification system 114 hosted by the cloud network 102.

It should be appreciated that FIG. 1 is merely illustrative and that other implementations might be utilized. For instance, the client device 132, the music attribute identification system 114, or other computing devices may be used singly or in combination to implement techniques of identifying attributes for music as described in the present disclosure. It should also be appreciated that network topology illustrated in FIG. 1 has been greatly simplified and that many more networks, devices, and databases may be utilized to interconnect various computing systems.

Cloud network 102 may be located at a data center, such as a single premise, or be distributed throughout different geographic locations (e.g., at several premises). Cloud network 102 may provide services via the one or more networks 130. Network 130 may comprise one or more public networks (e.g., the Internet) and/or one or more private networks. A private network may include a wireless local area network (WLAN), a local area network (LAN), a wide area network (WAN), a cellular network, or an intranet. Network 130 may comprise wired network(s) and/or wireless network(s). For example, network 130 may comprise physical links, such as coaxial cable links, twisted pair cable links, fiber optic links, a combination thereof, and/or the like. As another example, network 130 may comprise wireless links, such as cellular links, satellite links, Wi-Fi links and/or the like. Network 130 may comprise a variety of network devices, such as routers, switches, multiplexers, hubs, modems, bridges, repeaters, firewalls, proxy devices, and/or the like.

The cloud network 102 may comprise a plurality of computing nodes 116 that host a variety of services. In an embodiment, the nodes 116 host a music attribute identification system 114. The nodes 116 may process tasks associated with the music attribute identification system 114. The plurality of computing nodes 116 may be implemented as one or more computing devices, one or more processors, one or more virtual computing instances, a combination thereof, and/or the like. The plurality of computing nodes 116 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

Music attribute identification system 114 may implement a number of the functions and techniques described herein. For example, music attribute identification system 114 may be configured to identify one or more attributes associated with music. Music attribute identification system 114 may be associated with an entity, such as a music discovery or music recommendation platform, seeking to identify attribute(s) associated with music. In an embodiment, music attribute identification system 114 comprises a MTT model that is trained to identify one or more attributes associated with music. For example, music attribute identification system 114 may comprise a MTT model that is trained to identify one or more attributes associated with music using audio signal 112a or 112b.

In an embodiment, music attribute identification system 114 trains the MTT model to identify one or more attributes associated with music. Music attribute identification system 114 may train the MTT model using training examples. The training examples used to train the MTT model may be generated in a variety of different ways. For example, the training examples may be manually generated using manual data entry. The training examples may additionally, or alternatively, be generated automatically using a computer.

The training examples used to train the MTT model may comprise either positive training examples or a combination of positive training examples and negative training examples. The number of training examples used to train the MTT model may vary, but in an embodiment, the million song dataset (MSD) is used to train the MTT model.

The training examples may indicate one or more attributes associated with a plurality of different music samples. The one or more attributes associated with a particular music sample may indicate one or more attributes of the music sample. For example, the one or more attributes associated with a particular music sample may indicate an attribute commonly happened in a geographic region associated with some other features of the music sample. For example, if a particular instrument used in a music sample is native to Mexico, the one or more attributes associated with that music sample may include Mexico as region. In an embodiment, each of the training examples may be classified into one or more different attributes. For example, there may be various attribute labels in the dataset, including, but not limited to, genre, mood, instrument, region, decade, etc.

Each of the music samples may be an entire song or may be an audio excerpt, such as a 30-second portion of a song. Each of the music samples may be associated with audio data (i.e. an audio clip) and/or label information. If a music sample is associated with audio data, the audio data may include an acoustic track from the music sample and/or an instrumental track from the music sample. The acoustic track may include the lyrics of the music sample, and the instrumental track may include the audio track of the music sample without any acoustics. If a music sample is associated with label information, the label information may indicate genre, mood, instrument, region, decade, etc.

As an illustrative example, to train the MTT model, music attribute identification system 114 may receive as input, from a training example database 106, training examples 118a-b. It should be appreciated that training example database 106 may comprise thousands even millions of training examples. Training examples 118a-b are merely for illustrative purpose. Training examples 118a-b may include information indicative of audio data representative of a plurality of music samples. Training examples 118a may additionally include information that indicates at least one attribute associated with the plurality of music samples.

In one example, training example 118a may be labelled data; training example 118a may include an audio signal 120a and at least one labelled attribute (i.e., label information) 122a. Audio signal 120a may include an audio signal associated with a first music sample. Audio signal 120a may include an acoustic track and/or an instrumental track associated with the first music sample. At least one labelled attribute 122a may indicate one or more attributes associated with the first music sample, such as genre, mood, instrument, region, decade, etc. Attribute 122a may have been identified manually, such as by an individual that listened to the first music sample. For example, the individual may have listened to the first music sample and recognized that the first music sample is a piece of rock music. The individual may then label attribute 122a as the genre being rock. In another example, training example 118b may be unlabelled data; training example 118b may include an audio signal 120b, but may not include label information. Audio signal 120b may include an acoustic track and/or an instrumental track associated with the second music sample.

Training examples 118a-b may be used by music attribute identification system 114 to train the MTT model. To train the MTT model using training examples 118a-b, music attribute identification system 114 may input training examples 118a-b and pair the input audio data with the expected output (i.e. the attribute(s) that have already been associated with the music samples). By pairing the input audio data with the known attributes in the respective music samples and using these pairs to train the MTT model, the MTT model may learn to associate particular features of audio data with different attributes. The MTT model may need to be trained on a large number of training examples before it has learned enough to make accurate attribute recognition. The desired recognition accuracy level may be determined by the entity or individual training the MTT model, and the MTT model may continue to be trained until it has learned enough to make attribute recognition with the desired level of accuracy.

To determine if the MTT model is making attribute recognition with the desired level of accuracy, the MTT model may be evaluated and tested. In one example, the MTT model may be evaluated using validation dataset. If the MTT model does not show satisfactory performance with the validation dataset, the MTT model will be trained using more training data. If the MTT model shows satisfactory performance with the validation dataset, the MTT model may be tested using test dataset. To evaluate and test the MTT model, validation data and test data may be input to the MTT model, and the output of the MTT model may be compared to expected results. Preferably, the validation dataset is different from the test dataset since splitting validation dataset and test dataset may avoid information leakage in a model selection process. By splitting validation dataset and test dataset, the best model may be selected. The selected best model may generalize better and will not be overfitted to the test data. The validation dataset may be a set of examples used to evaluate the MTT model, and the test dataset may be another set of examples used to test the MTT model.

The validation data (validation examples) and the test data (test examples) that are input to the MTT model may be similar to the data that are used to train the MTT model (e.g., labeled data used to train the MTT model). For example, one validation or test example may include audio data associated with a music sample. While the validation or test example also includes one or more attributes associated with that music sample, the one or more attributes are not input into the MTT model. Rather, the audio data associated with the music sample may be input to the MTT model to see which attribute(s) the MTT model identifies are associated with the music sample. This recognition may be compared to the one or more attributes associated with the music sample as indicated by the validation or test example (i.e. the expected result, label information). If a certain percentage of the recognition results using the validation or test data do not match their respective expected results (i.e., label information), the MTT model may need to be trained on more and/or a greater variety of training examples. This process of training, evaluating, and testing may be repeated over and over again until the MTT model is recognizing attributes at the desired level of accuracy.

Figure 2:
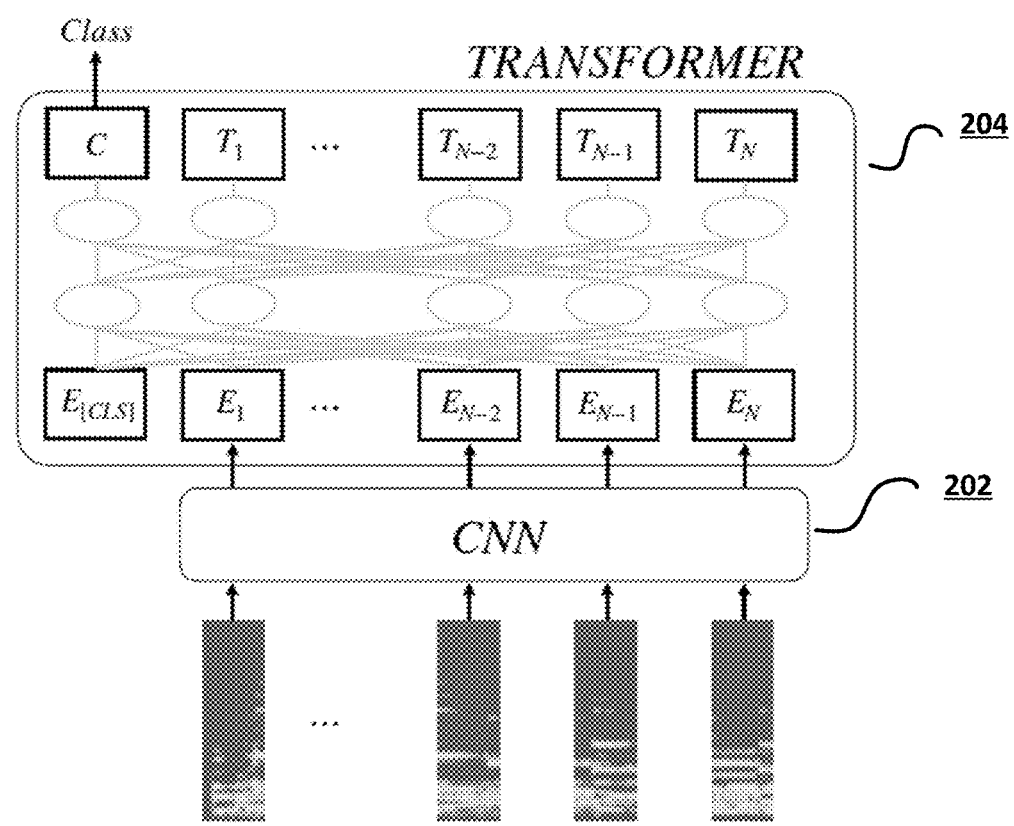
FIG. 2 illustrates an example model of Music Tagging Transformer that may be used in accordance with the present disclosure.

As an illustrative embodiment, FIG. 2 illustrates an example model representative of structures of a MTT model 200. The MTT model 200 comprises two parts: a CNN front end 202 and a Transformer back end 204. The CNN front end 202 captures local acoustic characteristics and the Transformer back end 204 globally summarizes the sequence of the extracted features.

In some embodiments, the CNN front end 202 may use 3×3 convolution filters with residual connections on mel spectrogram inputs. FIG. 3 illustrates an example table 300 depicting a CNN front end 202 of the MTT model 200. FIG. 3 outlines a 3-layered CNN front end where B represents a batch size, C represents convolution channels, F represents a number of mel bins, T represents a number of frames, and C' represents attention channels of the Transformer. The CNN front end 202 may not only help the MTT model 200 to leverage local representations captured by CNN but also reduce the time resolution of the input. At the end of the CNN frond end 202, the second and the third dimensions may be reshaped into a single dimension. As a result, the output of the CNN may be a sequence of short-chunk audio features where a chunk corresponds to approximately 0.1 second. The sequence of short-chunk audio features may be input to the Transformer back end 204.

The Transformer back end 204 comprises stacked multi-head self-attention layers. In contrast to Convolutional Neural Network with Self-Attention (CNNSA), which uses frequency-axis max pooling at the end of its front end, the attention layers in MTT model 200 may be given more detailed spectral information. By way of example and without limitation, the MTT model 200 may comprise 4 layers, 256 attention dimensions, and 8 attention heads. At the input stage of the Transformer back end 204, positional embedding may be applied and a special token embedding $E_{[CLS]}$ may be inserted so that the Transformer back end 204 can perform sequence classification (as shown in FIG. 2) as a downstream task.

Figure 4A:
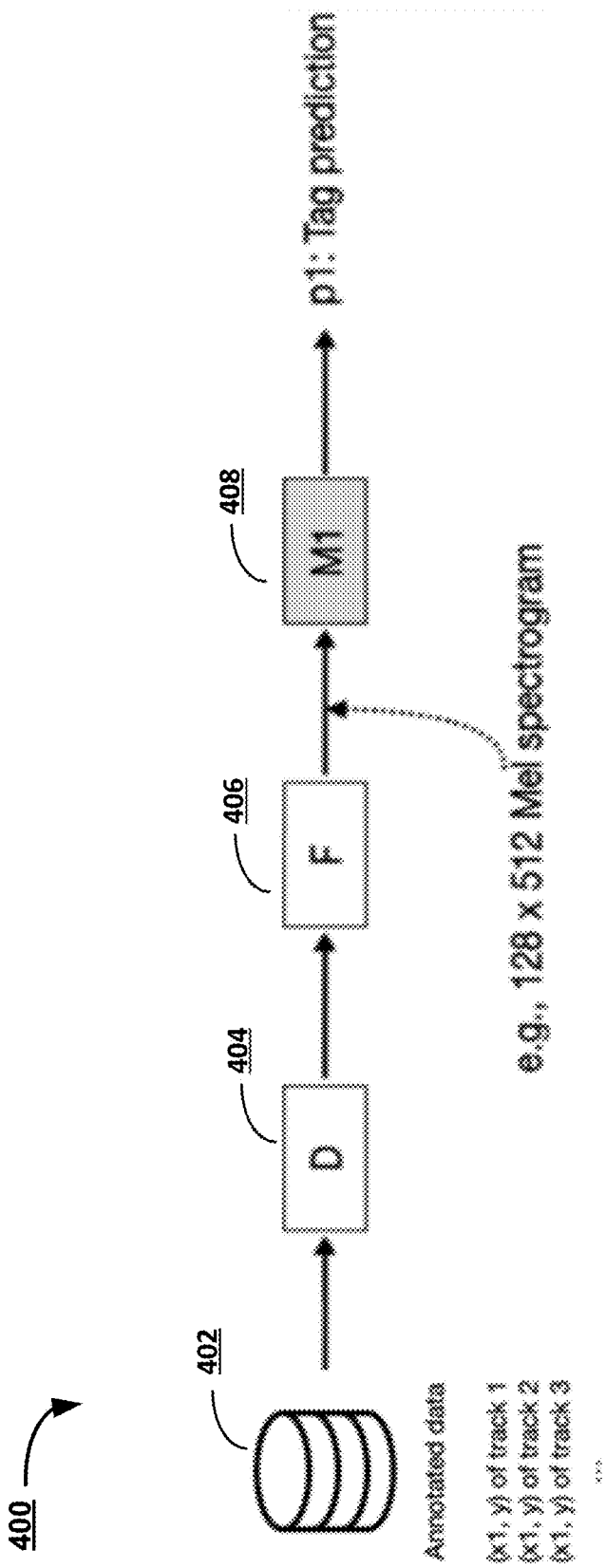
FIGS. 4a-b illustrate an example process for noisy student training that may be used in accordance with the present disclosure.

To utilize unlabelled data, the MTT model may be improved by using a noisy student training mechanism. The noisy student training mechanism is a semi-supervised learning approach. FIG. 4a illustrates an example process 400 for teacher training. The teacher training example process 400 may use labelled data (e.g., annotated data 402) to train a teacher model (M1) 408. The process 400 may comprise a data augmentation (D) sub-process 404 and a short-time Fourier transform (F) sub-process 406.

The annotated data 402 may comprise audio data (x1) of a plurality of music samples and label information (y) indicative of attributes of the plurality of music samples. The annotated data 402 may be collected from a dataset including music samples, for example, the million song dataset (MSD). Each of the music samples may be an entire song or may be a portion of a song, such as a 30-second portion of a song. The audio data may include a vocal track from the music sample and/or an instrumental track from the music sample. The vocal track may include the lyrics of the music sample, and the instrumental track may include the audio track of the music sample without any vocals. The label information may indicate any information about the music sample, such as song title, artist name, album, genre, mood, instrument, region, decade, etc.

In order to get a stronger teacher model (M1) 408, data augmentation may be utilized in the supervised learning approach. The data augmentation (D) sub-process 404 may include any suitable data augmentation techniques, such as random crop, polarity inversion, additive noise, gain control, high-/low-pass filter, delay, pitch shift, and reverb. Data augmentation can play an important role in noisy student training mechanism. Audio Augmentation library, which is easily integrated to PyTorch data pipeline, may be used. In one embodiment, the applied data augmentation methods may comprise:

(1) Polarity inversion,
(2) Additive noise by $k_{snr} \in \{0.3, 0.5\}$,
(3) Random gain by $A \in \{-20, -1\}$ dB,
(4) High-pass filter by $f_H \in \{2200, 4000\}$ Hz, (5) Low-pass filter by $f_L \in \{200, 1200\}$ Hz,
(6) Delay by $t \in \{200, 500\}$ ms,
(7) Pitch shift by $n \in \{-7, 7\}$ semitones, and
(8) Reverb by room size $s \in \{0, 100\}$.

Each augmentation method may be activated independently with a probability $p \in \{0.3, 0.7\}$.

The short-time Fourier transform (F) sub-process 406 may generate an image representative of the audio data (x1) of a piece of music by preprocessing the audio data (x1) of the piece of music. The image representative of the audio data (x1) of a piece of music may be a mel-spectrogram representative of how a frequency of the audio signal of the music sample varies with time. In one embodiment, features of audio data (x1) may be extracted to a Mel spectrogram, for example, 128×512 Mel spectrogram.

The teacher model (M1) 408 is trainable. The teacher model (M1) 408 may be trained to identify at least one attribute (e.g., p1: Tag prediction as shown in FIG. 4a) associated with a piece of music. The teacher model 408 may be trained using labelled data, e.g., annotated data 402 which include audio data (x1) and label information (y). The label information (y) may be manually labeled attribute(s) of a corresponding piece of music among the training data. The teacher model (M1) 408 may be trained by applying the training data to the teacher model (M1) 408 until the model reaches a predetermined recognition accuracy. Applying the training data to the teacher model (M1) 408 may involve pairing the audio data (x1) of the training examples with the expected output, i.e., the label information (y) that have already been associated with the music samples. By pairing the audio data (x1) with the label information (y) and using these pairs to train the teacher model (M1) 408, the teacher model (M1) 408 may learn to associate particular features of audio data with different label information.

The teacher model (M1) 408 may need to be trained on a large number of training examples or a variety of different training examples before it has learned enough to make accurate attribute recognition. The desired accuracy recognition level may be determined by the entity or individual training the teacher model (M1) 408, and the teacher model (M1) 408 may continue to be trained until it has learned enough to make attribute recognition with the desired level of accuracy. To determine if the teacher model (M1) 408 is making attribute recognition with the desired level of accuracy, the teacher model (M1) 408 may be tested, and the attribute recognition accuracy of the teacher model (M1) 408 may be evaluated. To test the teacher model (M1) 408, test examples may be input to the teacher model (M1) 408, and the output of the teacher model (M1) 408 may be compared to an expected result. This process of training and testing may be repeated over and over again until the teacher model (M1) 408 is recognizing attributes at the desired level of accuracy.

Figure 4B:
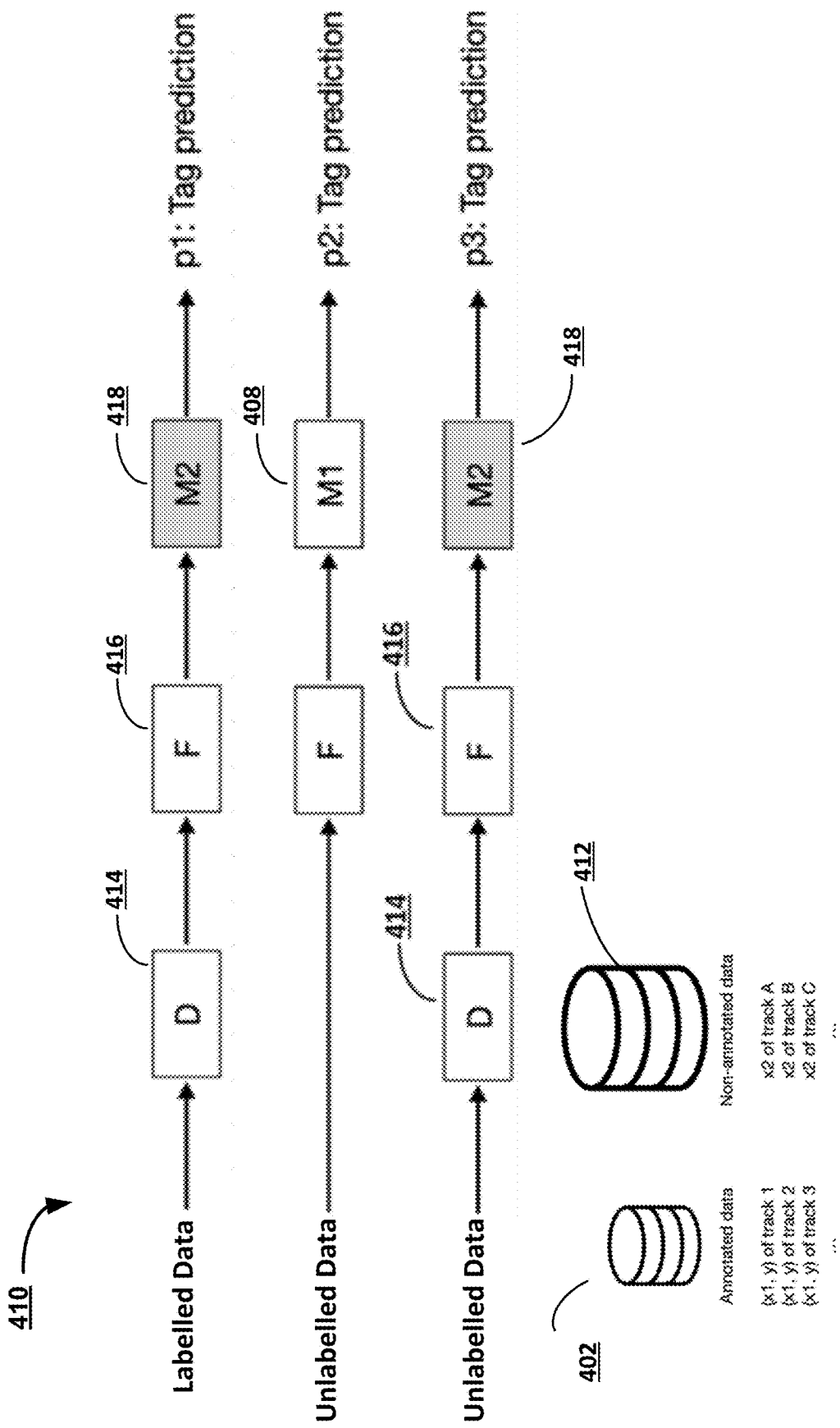

FIG. 4b illustrates an example process 410 for student training. The student training example process 410 uses both labelled data (e.g., annotated data 402) and unlabelled data (e.g., non-annotated data 412) to train a student model (M2) 418. The process 410 may comprise a data augmentation (D) sub-process 414 and a short-time Fourier transform (F) sub-process 416.

The annotated data 402 may comprise audio data (x1) of a plurality of music samples and label information (y) indicative of attributes of the plurality of music samples. The non-annotated 412 may comprise audio data (x2) of a plurality of music samples. The non-annotated 412 may not include label information (e.g., manually labelled information). The non-annotated data 412 may be collected from a dataset including music samples, for example, the MSD. Each of the music samples may be an entire song or may be a portion of a song, such as a 30-second portion of a song. The audio data (x2) may include a vocal track from the music sample and/or an instrumental track from the music sample. The vocal track may include the lyrics of the music sample, and the instrumental track may include the audio track of the music sample without any vocals. The data augmentation (D) sub-process 414 and the short-time Fourier transform (F) sub-process 416 may be similar to the data augmentation (D) sub-process 404 and the short-time Fourier transform (F) sub-process 406, respectively.

In the student training process 410, the student model (M2) 418 is trainable. The student model 418 may be trained using labeled data, e.g., the annotated data 402. Applying the annotated data 402 to the student model (M2) 418 may involve pairing the audio data (x1) of the training examples with the expected output, i.e., the label information (y). By pairing the audio data (x1) with the label information (y) and using these pairs to train the student model (M2) 418, the student model (M2) 418 may learn to associate particular features of audio data (x1) with different label information (y).

The student model (M2) 418 may need to be trained on a large number of training examples or a variety of different training examples before it has learned enough to make accurate attribute recognition. The desired accuracy recognition level may be determined by the entity or individual training the student model (M2) 418, and the student model (M2) 418 may continue to be trained until it has learned enough to make attribute recognition with the desired level of accuracy. To determine if the student model (M2) 418 is making attribute recognition with the desired level of accuracy, the student model (M2) 418 may be evaluated and tested using labeled data. The attribute recognition accuracy of the student model (M2) 418 may be evaluated using validation dataset. If the student model shows satisfactory accuracy with the validation dataset, the MTT model may be tested using test dataset. To evaluate and test the student model (M2) 418, validation examples or test examples may be input to the student model (M2) 418, and the output of the student model (M2) 418 may be compared to expected results (i.e., label information of labeled data). This process of training, evaluating, and testing may be repeated over and over again until the student model (M2) 418 shows desirable performance on labelled test dataset. A well-trained student model 418 may be used as the MTT model to predict attributes of any particular piece of music.

As shown in FIG. 4b, unlabelled data (e.g., the non-annotated data 412) may be pre-processed by the short-time Fourier transform (F) sub-process 416, and then be input to the pretrained teacher model (M1) 408. The pretrained teacher model may generate pseudo label information (e.g., associated with the unlabelled data. The pseudo label information indicates attributes of the unlabelled data. The teacher model (M1) 408 is not trainable during the student training process.

The unlabelled data (e.g., the non-annotated data 412) and the pseudo label information indicative of the attributes of the unlabelled data may then be used to train the student model (M2) 418. Applying the training data to the student model (M2) 418 may involve pairing the audio data (x2) of the training examples with the expected output, i.e., the pseudo label information generated by the pretrained teacher model (M1) 408. By pairing the audio data (x2) with the pseudo label information in the respective music samples and using these pairs to train the student model (M2) 418, the student model (M2) 418 may learn to associate particular features of audio data information with different attributes. The student model (M2) 418 may be trained by applying the training data to the student model (M2) 418 until the model reaches a predetermined recognition accuracy. The desired accuracy recognition level may be determined by the entity or individual training the student model (M2) 418. In one embodiment, the student model (M2) 418 may make the same prediction as the teacher model (M1) 408. In another embodiment, the trained student model (M2) 418 may outperform the teacher model (M1) 408. In some embodiments, a well-trained student may be used as a new teacher model for training another student model to obtain an even better performing model.

As an illustrative embodiment, FIG. 5 illustrates an example pseudocode for noisy student training mechanism which utilizes labelled data (e.g., annotated data 402) and unlabelled data (non-annotated data 412). First, using a conventional supervised learning approach, a teacher model T (e.g., the teacher model 408) may be trained as shown in lines 1-6 of the codes. Then, a student model S (e.g., the student model 418) may be trained with two types of losses. The first loss $l_1$ is coming from the typical supervised approach using labelled data (as shown in lines 10-11 of the codes). The second loss $l_2$ is from unlabelled data and corresponds to pseudo-labels (i.e., pseudo label information) which are generated by the teacher model as shown in lines 12-15 of the codes). The student model may mimic the teacher model. The student model may also enlarge data set by applying data augmentation (as shown in line 13 of the codes). Both hard labels and soft labels may be used for the pseudo-labels.

A well-trained student model S may outperform a teacher model T. Furthermore, the whole training process can be repeated by using the student model as a new teacher model and training another student model to obtain an even better performing model. In another example, for a stronger teacher model, data augmentation may be utilized in the supervised learning pipeline (corresponding to lines 1-6 and 10-11 of the codes) as well. The only pipeline without data augmentation is the pseudo-label generation operation corresponding to line 12 of the codes.

In one example, the size of a student model (e.g., the student model 418) may be identical or larger than that of a teacher model (e.g., the teacher model 408). In this situation, the training process may be identified as knowledge expansion (KE). That means the knowledge in the teacher model is upgraded in the student model. The student model may be expected to perform better than the teacher model by giving the student model (enough capacity and difficult environments in terms of noise to learn through. In another example, the student model may be designed to be smaller than the teacher model. In this case, the training process may be identified as knowledge distillation (KD). As smaller models are less expensive to evaluate, knowledge distillation (KD) may be deployed on less powerful hardware, such as a mobile device. Knowledge expansion (KE) and knowledge distillation (KD) are complementary. Depending on the aim for performance and/or efficiency, knowledge expansion (KE) and/or knowledge distillation (KD) may be performed.

Figure 6:
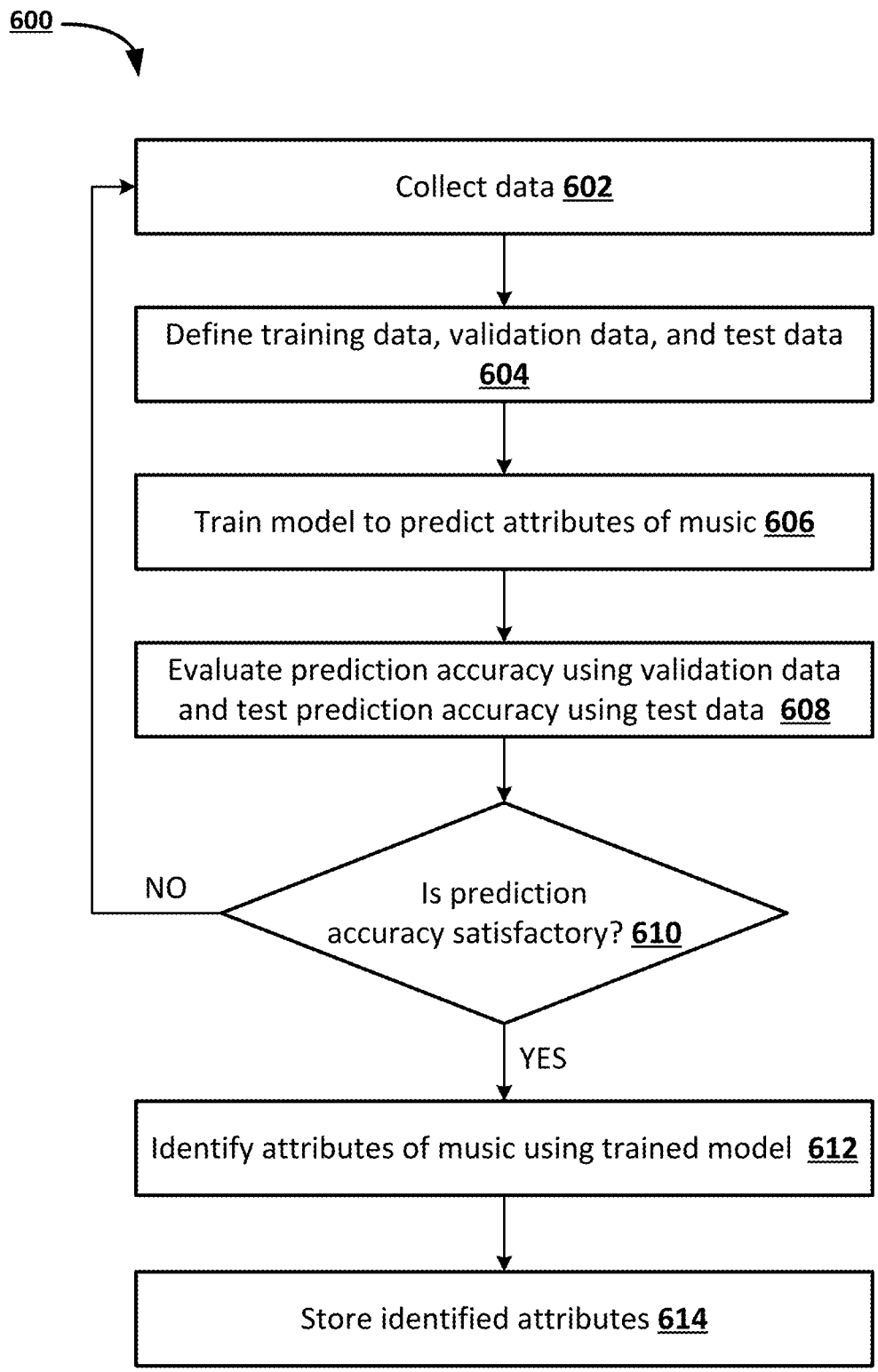
FIG. 6 illustrates an example process for training and applying a Music Tagging Transformer model that may be used in accordance with the present disclosure.

FIG. 6 depicts an example process 600 for training and applying a MTT model, such as MTT model 200. The process 600 may be performed, for example, by music attribute identification system 114 of FIG. 1. A MTT model needs to be trained and tested before it is used to recognize attributes associated with a particular piece of music. To train and test the MTT model, training data and testing data may be generated. Training data and testing data may be generated using different datasets.

At 602, data is collected. The data may be collected from a dataset including music samples. In some embodiments, the publicly available MSD with annotations collected from user-generated tags may be used. Each of the music samples may be an entire song or may be a portion of a song, such as a 30-second portion of a song. Some of the music samples may be labelled data which comprise audio data (i.e. an audio clip) and label information. Other music samples may be unlabelled data which comprise audio data, but do not include label information. The audio data may include a vocal track from the music sample and/or an instrumental track from the music sample. The vocal track may include the lyrics of the music sample, and the instrumental track may include the audio track of the music sample without any vocals. The label information may indicate any information about the music sample, such as song title, artist name, album, genre, mood, instrument, region, decade, etc.

The collected data may be used to train, evaluate, and/or test the MTT model. At 604, training dataset, validation dataset, and test datasets are defined. In some embodiments, the MSD may be used to train, evaluate, and test the MTT model. The MSD may comprise one million songs with audio features and label information. One approach may be to take the most frequent 50 tags and select tracks that have at least one of the tags. This results in 242 k songs that are split into training, validation, and test set. This approach is referred to as conventional MSD split.

However, there are some problems with the conventional MSD split. For example, since the MSD music tags are collected from users, some of them are very noisy and may lead to noisy evaluation (i.e., incorrect evaluation). In addition, a strict split of music items requires to take the artist information into consideration since often, songs and labels from the same artist heavily resembles each other. But the conventional MSD split was done without such consideration, which has caused unintended information leakage between the training and evaluation sets. As a result, this would cause overly optimistic evaluation.

To address the problems, in some embodiments, data may be manually cleaned, which means cleaning very noisy MSD music tags. The top 50 tags among the cleaned data may be selected for use. In other embodiments, a new split of MSD may be used. The new split does not share any artist among training/validation/test sets, and the new split can be extended to more tracks. This new split may be referred to as Cleaned and Artist-level Split (C&A split). In one example, the C&A split may consist of 233 k labeled tracks and 516 unlabeled tracks. The C & A split may utilize the entire MSD audio although the rest 250 k tracks are discarded to avoid information leakage by shared artists.

The training examples for the MTT model may be generated in a variety of different ways. For example, the training examples may be manually generated using manual data entry. The training examples may additionally, or alternatively, be generated automatically using a computer. The training examples used to train the MTT model may comprise either positive training examples or a combination of positive training examples and negative training examples. The number of training examples used to train the MTT model may vary, but in an embodiment, about one million training examples are used to train the MTT model.

The training examples may indicate one or more attributes associated with a plurality of different music samples, such as music samples collected at 602. The one or more attributes associated with a particular music sample may indicate one or more attributes of the music sample. For example the one or more attributes associated with a particular music sample may indicate an attribute commonly happened in a geographic region associated with some other features of the music sample. For instance, if a particular instrument, such as fiesta, used in a music sample is native to Mexico, the one or more attributes associated with that music sample may include Mexico as region. In an embodiment, each of the training examples may be classified into one or more different attributes. There may be various attribute labels in the dataset, including, but not limited to, genre, mood, instrument, region, decade, etc.

The MTT model may be trained on the generated training data, including labelled data and unlabelled data. At 606, the MTT model may be trained to identify one or more attributes associated with a piece of music. The generated training examples may be used to train the MTT model. In one embodiment, audio data of some training examples may be paired with label information that have already been manually associated with corresponding music samples. Audio data of other training examples may be paired with pseudo-labels (i.e., pseudo label information) generated by a pre-trained teacher model. By pairing the audio data with label information or pseudo label information in the respective music samples and using these pairs to train the MTT model, the MTT model may learn to associate various audio data with particular attributes. A trained MTT model may identify one or more attributes of a piece of music based on the audio data of the piece of music.

The MTT model may need to be trained on a large number of training examples or a variety of different training examples before it has learned enough to make accurate attribute recognition. The desired recognition accuracy level may be determined by the entity or individual training the MTT model, and the MTT model may continue to be trained until it has learned enough to make attribute recognition with the desired level of accuracy. To determine if the MTT model is making attribute recognition with the desired level of accuracy, the MTT model may be tested. The MTT model may be tested using the generated test data. At 608, the attribute recognition accuracy of the MTT model may be evaluated. To test the MTT model, the audio data of the generated test examples may be input to the MTT model, and the output of the MTT model may be compared to an expected result.

While, like the training examples, the test examples include one or more attributes associated with that music sample. The one or more attributes are not input into the MTT model during testing. Rather, only audio data associated with the music samples may be input to the MTT model to see which attributes the MTT model recognizes are associated with the music samples. The recognition results may be compared to the attributes indicated by the label information included in the test examples (i.e. the expected results).

If the recognition results do not match the expected results, the MTT model may need to be trained on more and/or a greater variety of training examples. This process of training and testing may be repeated over and over again until the MTT model is producing recognition results at the desired level of accuracy. At 610, it may be determined whether the attribute recognition accuracy is satisfactory. The attribute recognition accuracy may be satisfactory if it meets or exceeds the desired level of accuracy. Conversely, the attribute recognition accuracy may not be satisfactory if it does not meet or exceed the desired level of accuracy. If the attribute recognition accuracy is not satisfactory, the example process 600 may return to 602 to collect more data. Additional training examples and/or testing examples may be generated based on this newly collected data. The MTT model may be further trained based on these new training examples, and re-tested. This process may continue until the attribute recognition accuracy is satisfactory.

If the attribute recognition accuracy is satisfactory, the example process 600 may proceed to 612. At 612, one or more attributes of a piece of music may be identified using the trained MTT model. For example, the one or more attributes associated with a particular music sample may indicate an attribute commonly happened in a geographic region associated with some other features of the music sample. For instance, if a particular instrument, such as fiesta, used in a music sample is native to Mexico, the one or more attributes associated with that music sample may include Mexico as region. In an embodiment, each of the training examples may be classified into one or more different attributes. There may be various attribute labels in the dataset, including, but not limited to, genre, mood, instrument, region, decade, etc.

At 614, the identified attributes and their associated music pieces may be stored. For example, the identified attributes and their associated music pieces may be stored in a database, such as recognition database 126. Once stored, this information may be used to make song recommendations, such as for users of client devices 132. For example, if a user is known to like rock music, stored pieces of music that are associated with the genre attribute of rock music may be recommended to that user. In an embodiment, a user may use a content application, such as content application 134 on client device 132 to listen to the recommended music.

Figure 7:
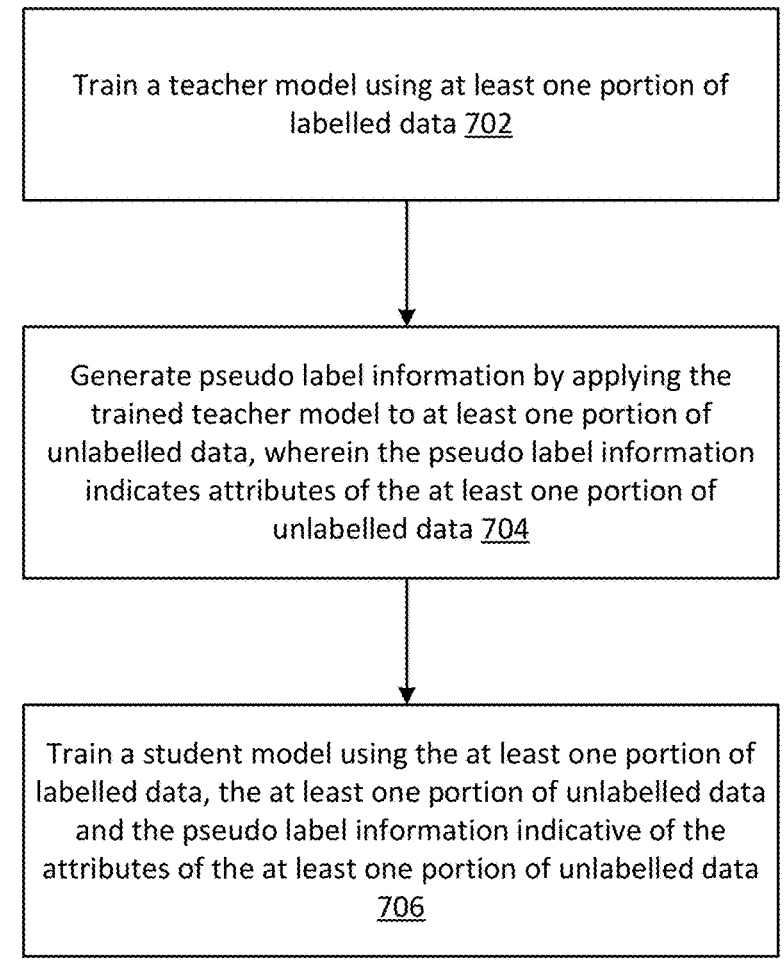
FIG. 7 illustrates an example process for training a Music Tagging Transformer model that may be used in accordance with the present disclosure.

FIG. 7 depicts an example process 700 for training a machine learning model, such as MTT model 200, using a noisy student training mechanism. The example process 700 may be performed, for example, by music attribute identification system 114 as shown in FIG. 1.

To train the MTT model, training data, such as training examples, may be generated. The training examples used to train the MTT model may be generated in a variety of different ways. For example, the training examples may be manually generated using manual data entry. The training examples may additionally, or alternatively, be generated automatically using a computer. The training examples used to train the MTT model may comprise either positive training examples or a combination of positive training examples and negative training examples.

At 702, a teacher model (e.g. the teacher model 408) is trained using at least one portion of labelled data. The labelled data comprise audio data of a plurality of music samples, and label information indicating at least one attribute corresponding to each of the plurality of music samples. The attributes of the plurality of music samples comprise genre, mood, instrument, region, decade, etc.

The teacher model may be trained to identify at least one attribute associated with a piece of music. The teacher model may be trained by applying training data to the teacher model until the model reaches a predetermined recognition accuracy. Applying the training data to the teacher model may involve pairing the audio data of the training examples with the expected output, i.e., label information that has already been associated with the music samples. By pairing the audio data with the known label information in the respective music samples and using these pairs to train the teacher model, the teacher model may learn to associate audio data with particular attributes.

The teacher model may need to be trained on a large number of training examples or a variety of different training examples before it has learned enough to make accurate attribute recognition. The desired accuracy recognition level may be determined by the entity or individual training the teacher model, and the teacher model may continue to be trained until it has learned enough to make attribute recognition with the desired level of accuracy. To determine if the teacher model is making attribute recognition with the desired level of accuracy, the teacher model may be tested, and the attribute recognition accuracy of the teacher model may be evaluated. To test the teacher model, test examples may be input to the teacher model, and the output of the teacher model may be compared to an expected result. For a stronger teacher model, data augmentation may be utilized.

At 704, pseudo label information is generated by applying the trained teacher model to at least one portion of unlabelled data, wherein the pseudo label information indicates attributes of the at least one portion of the unlabelled data. The pseudo-labelling method may be able to use the unlabelled samples to learn the underlying structure of the data. The pseudo-labelling method may improve a model's performance by using a small set of labelled data along with a large amount of unlabelled data. Both hard labels and soft labels may be used for the pseudo-labels.

In the teacher-student training process, the student may mimic the teacher's behavior. At 706, a student model may be trained using the at least one portion of the labelled data, the at least one portion of the unlabelled data, and the pseudo label information indicative of the attributes of the at least one portion of the unlabelled data. The student model may be trained with two types of losses. The first loss may be coming from the typical supervised approach with labelled data as done for the teacher model. The second loss may be from unlabelled inputs and corresponding pseudo-labels which are generated by the teacher model. The student model size may be equal to or smaller than the size of the teacher model. The student model may also enlarge data set by applying data augmentation. In one embodiment, the student model may make the same prediction as the teacher model. In another embodiment, the trained student model may outperform the teacher model. Furthermore, the whole training process can be repeated by using the trained student model as a new teacher model to train another student model to obtain an even better performing model.

Figure 8:
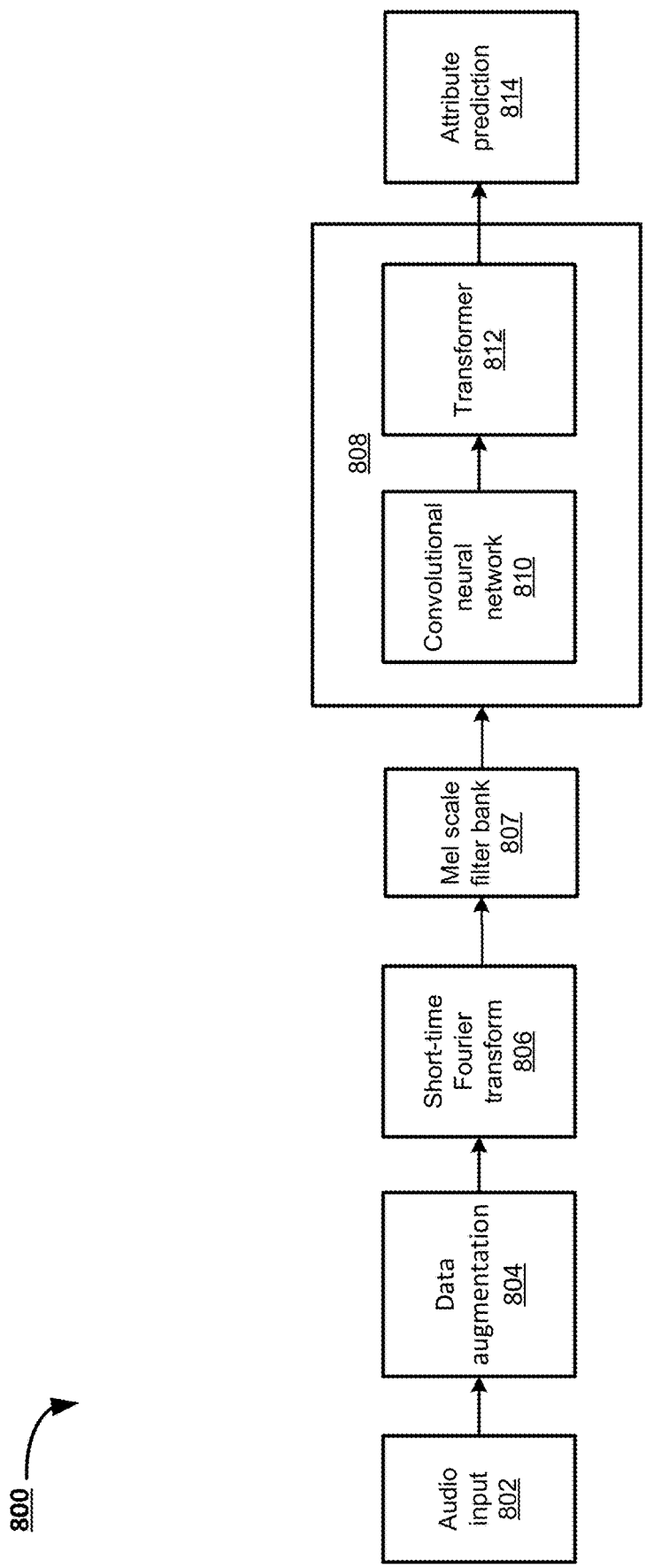
FIG. 8 illustrates an example process for applying a Music Tagging Transformer model that may be used in accordance with the present disclosure.

A trained MTT model may be applied to recognize one or more attributes associated with music. FIG. 8 illustrates an example process 800 that uses a trained MTT model to identify one or more attributes associated with music, such as music 108 shown in FIG. 1. In an embodiment, the trained MTT model may be a part of music attribute identification system 114 as shown in FIG. 1. The trained MTT model may have been trained using a process similar to that described above.

At 802, audio data associated with a piece of music may be received. The piece of music may be a piece of music that an individual or entity wants to classify based on its attribute. The piece of music may be an entire song or may be a portion of a song, such as a 30-second portion of a song. The audio data may include a vocal track from the piece of music and/or an instrumental track from the piece of music. The vocal track may include the lyrics of the piece of music, and the instrumental track may include the audio track of the piece of music without any vocals.

The example process 800 may enlarge data set by applying data augmentation at 804. Data augmentation may significantly increase the diversity of data available for the MTT model, without actually collecting new data. Data augmentation may include any suitable data augmentation techniques, such as random crop, polarity inversion, additive noise, gain control, high-pass/low-pass filter, delay, pitch shift, reverb, and so on.

The example process 800 may generate an image representative of the audio data of the piece of music by using short-time Fourier transform at 806 and using Mel scale filter bank at 807. In one embodiment, the image representative of the audio data of a piece of music may be a Mel spectrogram (e.g., 128×512 Mel spectrogram) representative of how a frequency of the audio signal of the music sample varies with time.

The MTT model 808 may comprise a convolutional neural network (CNN) 810 and a Transformer 812. The CNN 810 may be applied on the image representative of the audio data of the piece of music, and output a sequence of features extracted from the image representative of the audio data of the piece of music. In an embodiment, the CNN 810 may use 3×3 convolution filters with residual connections on mel spectrogram inputs. At the end of the CNN 810, the second and the third dimensions may be reshaped into a single dimension. By way of example and without limitation, the output of the CNN 810 may be a sequence of short-chunk audio features where a chunk corresponds to approximately 0.1 second. The sequence of short-chunk audio features may be input to the Transformer 812. The Transformer 812 may comprise stacked multi-head self-attention layers. In one embodiment, the Transformer 812 may choose 4 layers, 256 attention dimensions, and 8 attention heads. The Transformer 812 may be applied on the sequence of features extracted from the image representative of the audio data of the piece of music, and output a prediction of at least one attribute of the piece of music at 814.

Figure 9:
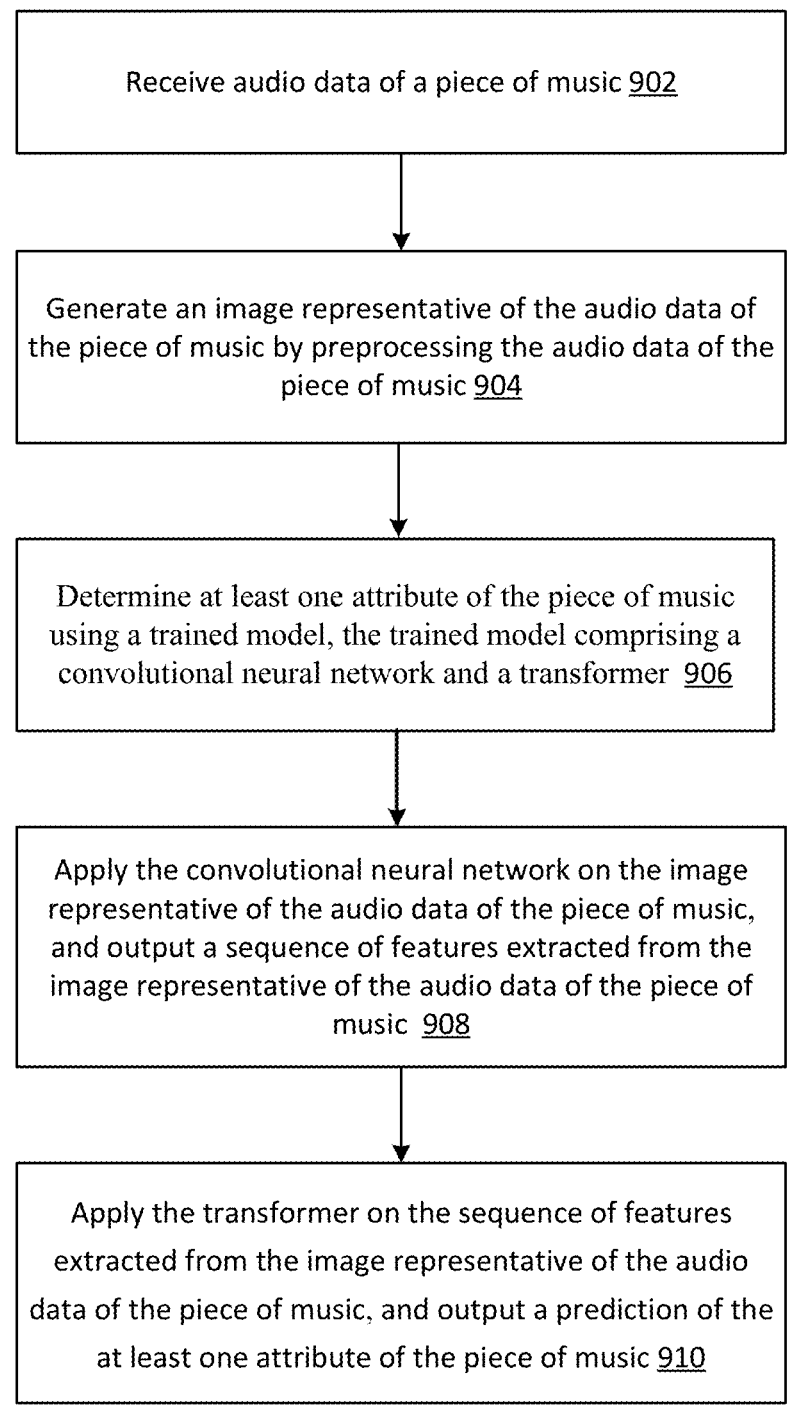
FIG. 9 illustrates an example process for applying a Music Tagging Transformer model that may be used in accordance with the present disclosure.

FIG. 9 depicts an example process 900 for applying a trained machine learning model, such as MTT model 200. The process 900 may be performed, for example, by music attribute identification system 114 as shown in FIG. 1.

The trained MTT model may be used to recognize attributes associated with at least one piece of music. At 902, audio data of a piece of music may be received to recognize one or more attributes associated with the piece of music. The piece of music may be a piece of music that an individual or entity wants to classify based on its attribute(s). The piece of music may be an entire song or may be a portion of a song, such as a 30-second portion of a song. The audio data may include a vocal track from the piece of music and/or an instrumental track from the piece of music. The vocal track may include the lyrics of the piece of music, and the instrumental track may include the audio track of the piece of music without any vocals.

At 904, an image representative of the audio data of the piece of music may be generated by preprocessing the audio data of the piece of music. In an embodiment, the image representative of the audio data of a piece of music may be a Mel spectrogram, for example, 128×512 mel spectrogram, or a mel-frequency cepstrum (MFCC) representative of how a frequency of the audio signal of the music sample varies with time. The spectrogram may have been generated using any system or technique, such as using a short-term Fourier transform or a machine learning module. In an embodiment, short-time Fourier transform may generate an image representative of the audio data of the piece of music by preprocessing the audio data of the piece of music.

At 906, at least one attribute of the piece of music may be determined using a trained model, for example, the trained MTT model. The trained MTT model may comprise a convolutional neural network and a Transformer. The piece of the music may be classified based on the determined at least one attribute. The at least one determined attribute may comprise e.g., genre, mood, instrument, region, decade, and so on.

At 908, the convolutional neural network may be applied on the image representative of the audio data of the piece of music, and output a sequence of features extracted from the image representative of the audio data of the piece of music. In an embodiment, the convolutional neural network may use 3×3 convolution filters with residual connections on Mel spectrogram inputs. At the end of the convolutional neural network, the second and the third dimensions may be reshaped into a single dimension. By way of example and without limitation, the output of the convolutional neural network may be a sequence of short-chunk audio features where a chunk may correspond to approximately 0.1 second. The sequence of short-chunk audio features may be input to the Transformer of the trained MTT model.

At 910, the Transformer may be applied on the sequence of features extracted from the image representative of the audio data of the piece of music, and output a prediction of the at least one attribute of the piece of music. The Transformer may comprise stacked multi-head self-attention layers. In one embodiment, the Transformer may comprise 4 layers, 256 attention dimensions, and 8 attention heads.

The recognition of one or more attributes associated with music pieces may be stored in a database, such as in recognition database 126 in FIG. 1. Once stored, this information may be used to make song recommendations, such as for users of client devices 132. For example, if a user is known to love rock music, stored pieces of music that are classifies as rock music may be recommended to that user. In an embodiment, a user may use a content application, such as content application 134 on client device 132 to listen to the recommended music.

Figure 10:
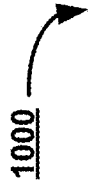

Music tagging models are typically evaluated with Area Under Receiver Operating Characteristic Curve (ROC-AUC). However, ROC-AUC may report overly optimistic results with highly skewed data. In some embodiments, both ROC-AUC and Area Under Precision-Recall Curve (PR-AUC) may be used as main evaluation metrics to evaluate the performance of music tagging models in the present disclosure. FIG. 10 illustrates an example table 1000 depicting performance comparison using the conventional split for top-50 music tagging. The performance comparison is conducted between current systems and the MTT model.

In table 1000, FCN represents Fully Convolutional Network. Musicnn represents a set of pre-trained deep convolutional neural networks for music audio tagging. Sample-level represents sample-level deep convolutional neural networks. SE represents Squeeze-and-Excitation. CRNN represents Convolutional Recurrent Neural Network. CNNSA represents Convolutional Neural Network with Self-Attention. CNN represents Convolutional Neural Network. ResNet represents Residual Network. Transformer represents the MTT model. DA is an abbreviation for Data Augmentation. The § and † marks mean the models are based on the identical model architecture and training strategy; compared to the models with the same marks as shown in FIG. 11, only the dataset split is different.

As shown in table 1000, the ROC-AUC and PR-AUC of many current models have been under 0.89 and 0.33, respectively. In contrast, the MTT model outperforms the current models, including FCN, Musicnn, Sample-level, Sample-level+SE, CRNN, CNNSA, Harmonic CNN, Short-chunk CNN, and short-chunk ResNet. The improvement, especially on PR-AUC, is non-trivial. When data augmentation is applied to the MTT model, the improvement gets even larger.

The front end of the MTT model takes a sequence of chunks. Each of the chunks represents a short duration of the signal which is about 0.1 second. Although 0.1 second would be short to represent musical characteristics alone, the method using a sequence of chunks and the results thereof may mean that the back end of the MTT model may play a role of sequential feature extractor instead of simple bag-of-feature aggregation. This may be an important aspect of the MTT model since sequential modeling may be the best choice for the self-attention mechanism.

In the meanwhile, table 1000 shows that the data augmentation may also contribute to the improvements of ROC-AUC and PR-AUC. As shown in FIG. 10, while using the MTT model without data augmentation, the ROC-AUC is 0.8916, and the PR-AUC is 0.3358. After introducing data augmentation to the MTT model, the ROC-AUC and PR-AUC are improved to 0.8972 and 0.3479, respectively. The improvements brought from data augmentation are 0.0056 ROC-AUC and 0.0119 PR-AUC, separately. The improvements achieved by the MTT model are more significant than many of the improvements that current different architecture choices have achieved. This may emphasize that data augmentation should be considered when developing a music tagging model.

FIG. 11 illustrates an example table 1100 depicting performance comparison using the C&A MSD split with various configurations. In table 1100. ResNet represents the short-chunk ResNets. Transformer represents the MTT model. DA represents data augmentation. KE and KD represent knowledge expansion and knowledge distillation, separately. The § and † marks mean they are based on the identical model architecture and training strategy; compared to the models with the same marks as shown in FIG. 10, only the dataset split is different. The comparison table 1100 not only shows the results of the two models, i.e., the short-chunk ResNets and the MTT model, but also summarizes the results of supervised models, models with data augmentation (DA), models with DA and knowledge expansion (KE), and models with DA and knowledge distillation (KD).

For both short-chunk ResNet and the MTT model, constant improvements may be observed when data augmentation and noisy student training (knowledge expansion) are applied accumulatively. For example, as shown in table 1100, the ROC-AUC values of Transformer, Transformer+DA, Transformer+DA+KE are 0.9188, 0.9191, 0.9204, respectively. The values show continuous improvements with DA and KE. This may indicate that for both architectures of the short-chunk ResNet and the MTT model, the size of dataset may be a factor that limits the performance of the models. Table 1100 also shows that the student model with smaller parameters (models with DA and KD) may have better performance than larger models, i.e., models with DA and KE. This may be explained more clearly if the models may be trained with a significantly richer dataset, which is bigger and has more diverse data. When enough suitable dataset is available, the models may be trained with a significantly richer dataset in the upcoming research.

Figure 12:
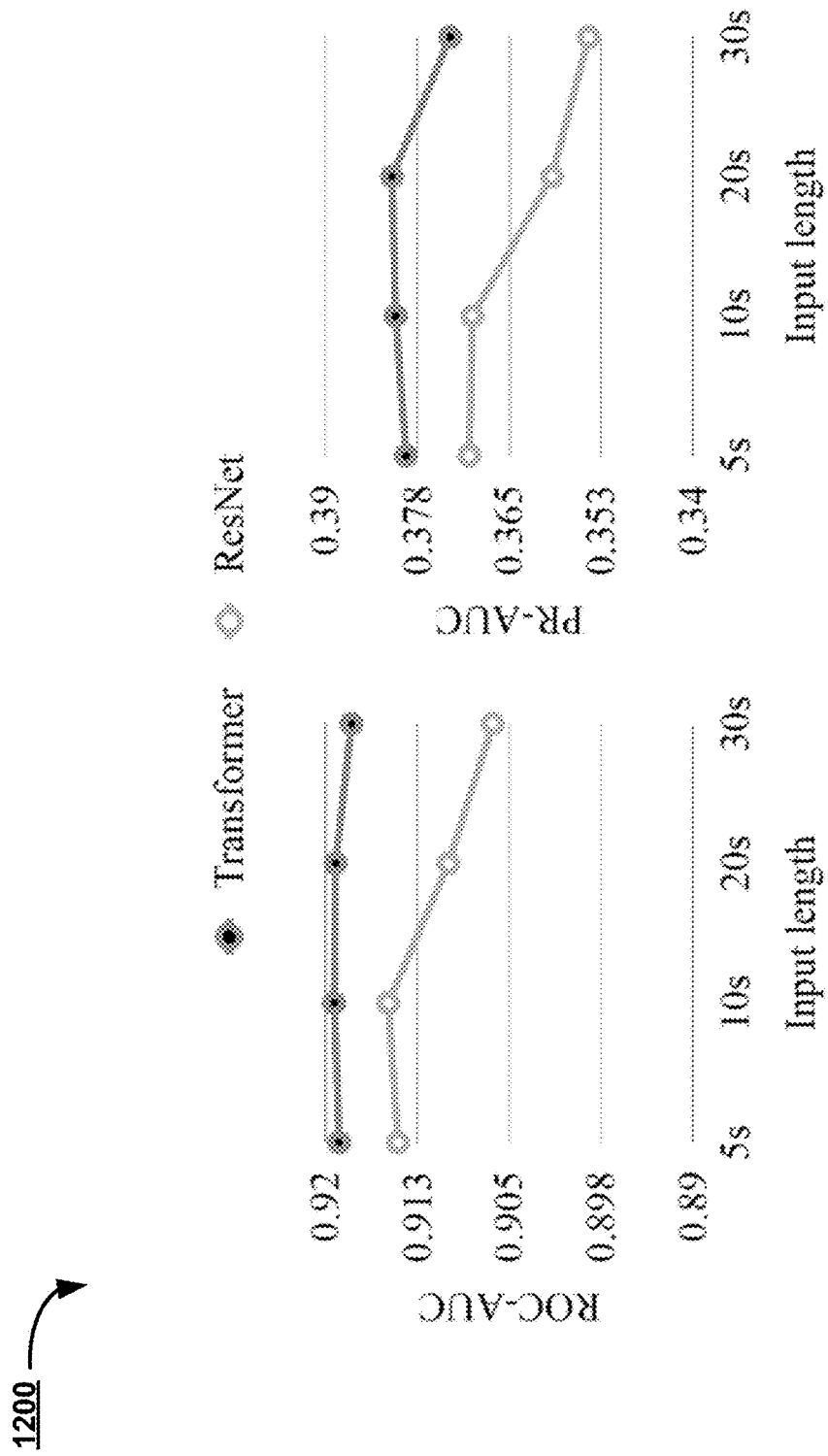
FIG. 12 illustrates example graphs depicting the varying performance ability of different music tagging models.

FIG. 12 illustrates an example graph 1200 depicting performance comparison with different input lengths. In graph 1200, Transformer represents the MTT model, and ResNet represents the short-chunk ResNets. Both the MTT model and short-chunk ResNet are trained with various input lengths to access the MTT model's ability to handle long sequence.

As shown in graph 1200, on both of the metrics, short-chunk ResNet shows a noticeable performance degradation as the audio input gets longer. This may indicate that the global max pooling in the short-chunk ResNet may be not perfectly suitable for a long signal. Meanwhile, the MTT model shows consistent performances in general. An exception is when the input is 30-second long. The performance drop happens maybe because the model cannot take advantage of random cropping data augmentation since the 30-second is the full length of the MSD previews. Overall, the MTT model outperforms the short-chunk ResNet.

FIG. 13 illustrates an example table 1300 depicting performance of the MTT with varying width and depth of the attention layers. In table 1300, the MTT model may achieve the best performance when the attention channels have width at 128 and 256, and their depth of 4 and 8 layers. These optimal parameters may be dependent on dataset. Generally, a larger network structure may perform better if a larger amount of training data is provided.

Figure 14:
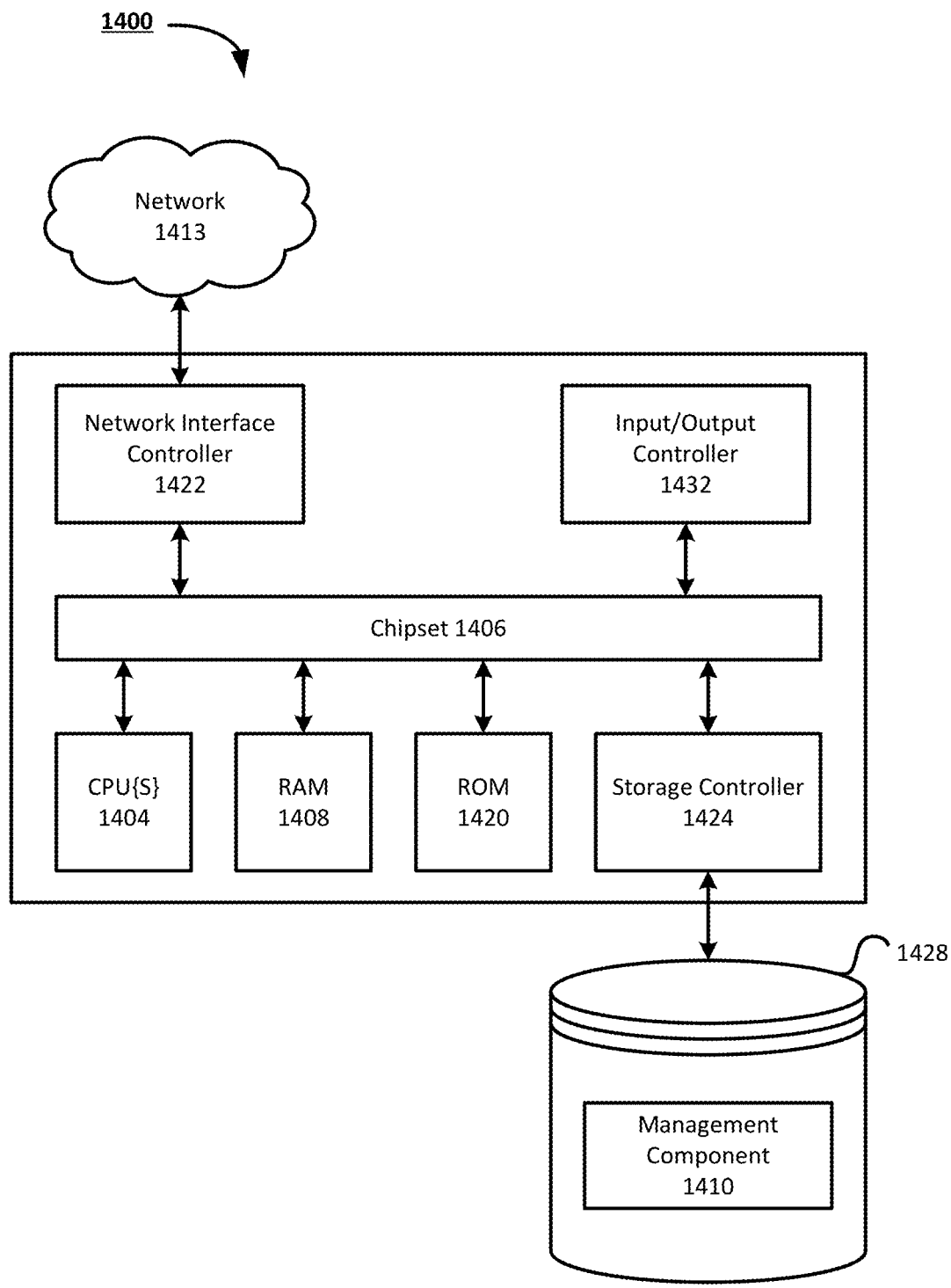
FIG. 14 illustrates an example computing device that may be used in accordance with the present disclosure.

FIG. 14 depicts a computing device that may be used in various aspects. With regard to the example environment of FIG. 1, one or more of music attribute identification system 114, music database 104, training example database 106, recognition database 126, or test database 128 may be implemented in an instance of a computing device 1400 of FIG. 14. The computer architecture shown in FIG. 14 shows a conventional server computer, workstation, desktop computer, laptop, tablet, network appliance, PDA, e-reader, digital cellular phone, or other computing node, and may be utilized to execute any aspects of the computers described herein, such as to implement the methods described in FIGS. 6-9.

The computing device 1400 may include a baseboard, or "motherboard," which is a printed circuit board to which a multitude of components or devices may be connected by way of a system bus or other electrical communication paths. One or more central processing units (CPUs) 1404 may operate in conjunction with a chipset 1406. The CPU(s) 1404 may be standard programmable processors that perform arithmetic and logical operations necessary for the operation of the computing device 1400.

The CPU(s) 1404 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1404 may be augmented with or replaced by other processing units, such as GPU(s). The GPU(s) may comprise processing units specialized for but not necessarily limited to highly parallel computations, such as graphics and other visualization-related processing.

A user interface may be provided between the CPU(s) 1404 and the remainder of the components and devices on the baseboard. The interface may be used to access a random access memory (RAM) 1408 used as the main memory in the computing device 1400. The interface may be used to access a computer-readable storage medium, such as a read-only memory (ROM) 1420 or non-volatile RAM (NVRAM) (not shown), for storing basic routines that may help to start up the computing device 1400 and to transfer information between the various components and devices. ROM 1420 or NVRAM may also store other software components necessary for the operation of the computing device 1400 in accordance with the aspects described herein. The user interface may be provided by a one or more electrical components such as the chipset 1406.

The computing device 1400 may operate in a networked environment using logical connections to remote computing nodes and computer systems through local area network (LAN). The chipset 1406 may include functionality for providing network connectivity through a network interface controller (NIC) 1422, such as a gigabit Ethernet adapter. A NIC 1422 may be capable of connecting the computing device 1400 to other computing nodes over a network. It should be appreciated that multiple NICs 1422 may be present in the computing device 1400, connecting the computing device to other types of networks and remote computer systems.

The computing device 1400 may be connected to a storage device 1428 that provides non-volatile storage for the computer. The storage device 1428 may store system programs, application programs, other program modules, and data, which have been described in greater detail herein. The storage device 1428 may be connected to the computing device 1400 through a storage controller 1424 connected to the chipset 1406. The storage device 1428 may consist of one or more physical storage units. A storage controller 1424 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1400 may store data on a storage device 1428 by transforming the physical state of the physical storage units to reflect the information being stored. The specific transformation of a physical state may depend on various factors and on different implementations of this description. Examples of such factors may include, but are not limited to, the technology used to implement the physical storage units and whether the storage device 1428 is characterized as primary or secondary storage and the like.

For example, the computing device 1400 may store information to the storage device 1428 by issuing instructions through a storage controller 1424 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1400 may read information from the storage device 1428 by detecting the physical states or characteristics of one or more particular locations within the physical storage units.

In addition or alternatively to the storage device 1428 described herein, the computing device 1400 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1400.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A storage device, such as the storage device 1428 depicted in FIG. 14, may store an operating system utilized to control the operation of the computing device 1400. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The storage device 1428 may store other system or application programs and data utilized by the computing device 1400.

The storage device 1428 or other computer-readable storage media may also be encoded with computer-executable instructions, which, when loaded into the computing device 400, transforms the computing device from a general-purpose computing system into a special-purpose computer capable of implementing the aspects described herein. These computer-executable instructions transform the computing device 1400 by specifying how the CPU(s) 1404 transition between states, as described herein. The computing device 1400 may have access to computer-readable storage media storing computer-executable instructions, which, when executed by the computing device 1400, may perform the methods described in relation to FIGS. 6-9.

A computing device, such as the computing device 1400 depicted in FIG. 14, may also include an input/output controller 1432 for receiving and processing input from a number of input devices, such as a keyboard, a mouse, a touchpad, a touch screen, an electronic stylus, or other type of input device. Similarly, an input/output controller 1432 may provide output to a display, such as a computer monitor, a flat-panel display, a digital projector, a printer, a plotter, or other type of output device. It will be appreciated that the computing device 1400 may not include all of the components shown in FIG. 14, may include other components that are not explicitly shown in FIG. 14, or may utilize an architecture completely different than that shown in FIG. 14.

As described herein, a computing device may be a physical computing device, such as the computing device 1400 of FIG. 14. A computing node may also include a virtual machine host process and one or more virtual machine instances. Computer-executable instructions may be executed by the physical hardware of a computing device indirectly through interpretation and/or execution of instructions stored and executed in the context of a virtual machine.

One skilled in the art will appreciate that the systems and methods disclosed herein may be implemented via a computing device that may comprise, but are not limited to, one or more processors, a system memory, and a system bus that couples various system components including the processor to the system memory. In the case of multiple processors, the system may utilize parallel computing.

For purposes of illustration, application programs and other executable program components such as the operating system are illustrated herein as discrete blocks, although it is recognized that such programs and components reside at various times in different storage components of the computing device, and are executed by the data processor(s) of the computer. An implementation of service software may be stored on or transmitted across some form of computer-readable media. Any of the disclosed methods may be performed by computer-readable instructions embodied on computer-readable media. Computer-readable media may be any available media that may be accessed by a computer. By way of example and not meant to be limiting, computer-readable media may comprise "computer storage media" and "communications media." "Computer storage media" comprise volatile and non-volatile, removable and non-removable media implemented in any methods or technology for storage of information such as computer-readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer. Application programs and the like and/or storage media may be implemented, at least in part, at a remote system.

As used in the specification and the appended claims, the singular forms "a," "an" and "the" include plural referents unless the context clearly dictates otherwise. Ranges may be expressed herein as from "about" one particular value, and/or to "about" another particular value. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   receiving audio data of a piece of music;
   determining at least one attribute of the piece of music based on the audio data of the piece of music using a model;
   wherein the model comprises a convolutional neural network (CNN) front end and a transformer backend, wherein the CNN front end captures local audio characteristics, and wherein the transformer backend temporally summarizes a sequence of extracted features to output the at least one attribute;
wherein the model is trained using training data, the training data comprise labelled data associated with a first plurality of music samples and unlabeled data associated with a second plurality of music samples, the labelled data comprise audio data of the first plurality of music samples and label information indicative of attributes of the first plurality of music samples, and the unlabeled data comprise audio data of the second plurality of music samples;
wherein training the model further comprises training a teacher model using at least one portion of the labelled data; and
generating pseudo label information by applying the trained teacher model to at least one portion of the unlabeled data, wherein the pseudo label information indicates attributes of the at least one portion of the unlabeled data.

2. The method of claim 1, further comprising:
generating an image representative of the audio data of the piece of music by preprocessing the audio data of the piece of music.

3. The method of claim 2, wherein the image representative of the audio data of the piece of music comprises a Mel spectrogram.

4. The method of claim 2, further comprising:
applying the convolutional neural network on the image representative of the audio data of the piece of music; and
outputting a sequence of features extracted from the image representative of the audio data of the piece of music.

5. The method of claim 4, further comprising:
applying the transformer on the sequence of features extracted from the image representative of the audio data of the piece of music; and
outputting a prediction of the at least one attribute of the piece of music.

6. The method of claim 1, wherein the convolutional neural network comprises 3×3 convolution filters with residual connections.

7. The method of claim 1, wherein the transformer comprises stacked multi-head self-attention layers.

8. The method of claim 1, wherein the model is trained using a noisy student training mechanism.

9. The method of claim 1, further comprising:
training a student model using the at least one portion of the labelled data, the at least one portion of the unlabeled data and the pseudo label information indicative of the attributes of the at least one portion of the unlabeled data.

10. A system, comprising:
at least one processor; and
at least one memory communicatively coupled to the at least one processor and storing instructions that upon execution by the at least one processor cause the system to perform operations, the operations comprising:
receiving audio data of a piece of music;
determining at least one attribute of the piece of music based on the audio data of the piece of music using a model;
wherein the model comprises a convolutional neural network (CNN) front end and a transformer backend, wherein the CNN front end captures local audio characteristics, and wherein the transformer backend temporally summarizes a sequence of extracted features to output the at least one attribute;
wherein the model is trained using training data, the training data comprise labelled data associated with a first plurality of music samples and unlabeled data associated with a second plurality of music samples, the labelled data comprise audio data of the first plurality of music samples and label information indicative of attributes of the first plurality of music samples, and the unlabeled data comprise audio data of the second plurality of music samples;
wherein training the model further comprises training a teacher model using at least one portion of the labelled data; and
generating pseudo label information by applying the trained teacher model to at least one portion of the unlabeled data, wherein the pseudo label information indicates attributes of the at least one portion of the unlabeled data.

11. The system of claim 10, the operations further comprising:
generating an image representative of the audio data of the piece of music by preprocessing the audio data of the piece of music.

12. The system of claim 11, the operations further comprising:
applying the convolutional neural network on the image representative of the audio data of the piece of music; and
outputting a sequence of features extracted from the image representative of the audio data of the piece of music.

13. The system of claim 12, the operations further comprising:
applying the transformer on the sequence of features extracted from the image representative of the audio data of the piece of music; and
outputting a prediction of the at least one attribute of the piece of music.

14. The system of claim 10, wherein the model is trained using a noisy student training mechanism.

15. The system of claim 11, the operations further comprising:
training a student model using the at least one portion of the labelled data, the at least one portion of the unlabeled data and the pseudo label information indicative of the attributes of the at least one portion of the unlabeled data.

16. A non-transitory computer-readable storage medium, storing computer-readable instructions that upon execution by a processor cause the processor to implement operations, the operations comprising:
receiving audio data of a piece of music;
determining at least one attribute of the piece of music based on the audio data of the piece of music using a model;
wherein the model comprises a convolutional neural network (CNN) front end and a transformer backend, wherein the CNN front end captures local audio characteristics, and wherein the transformer backend temporally summarizes a sequence of extracted features to output the at least one attribute;
wherein the model is trained using training data, the training data comprise labelled data associated with a first plurality of music samples and unlabeled data associated with a second plurality of music samples, the labelled data comprise audio data of the first plurality of music samples and label information indicative of attributes of the first plurality of music samples, and the unlabeled data comprise audio data of the second plurality of music samples;

wherein training the model further comprises training a teacher model using at least one portion of the labelled data; and generating pseudo label information by applying the trained teacher model to at least one portion of the unlabeled data, wherein the pseudo label information indicates attributes of the at least one portion of the unlabeled data.

17. The non-transitory computer-readable storage medium of claim 16, the operations further comprising:

applying the convolutional neural network on an image representative of the audio data of the piece of music;

outputting a sequence of features extracted from the image representative of the audio data of the piece of music;

applying the transformer on the sequence of features extracted from the image representative of the audio data of the piece of music; and outputting a prediction of the at least one attribute of the piece of music.

18. The non-transitory computer-readable storage medium of claim 16, wherein the model is trained using a noisy student training mechanism.

* * * * *